K. RUSHTON.
CAR TRUCK.
APPLICATION FILED JUNE 29, 1916.
1,198,964. Patented Sept. 19, 1916.
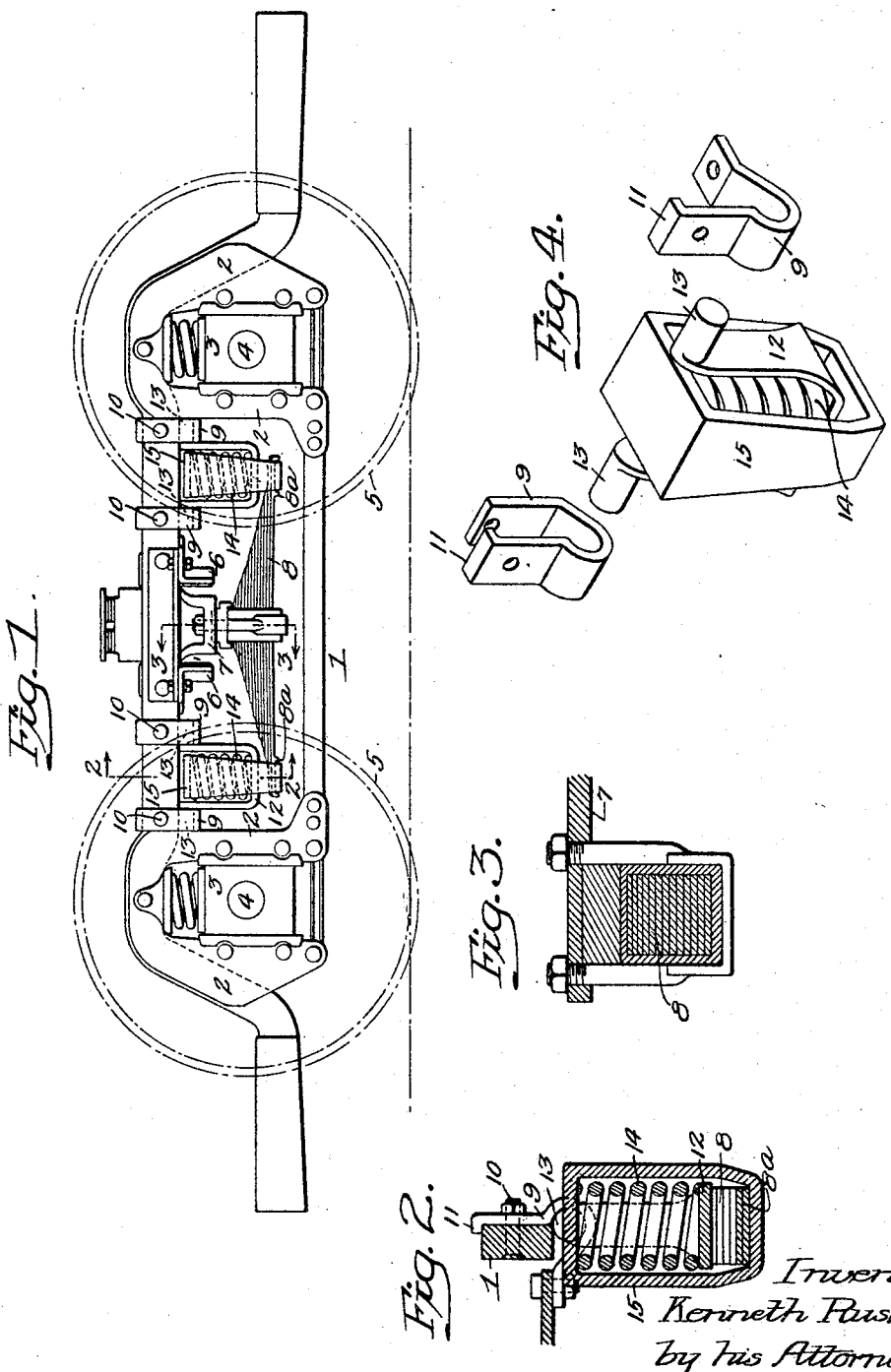

UNITED STATES PATENT OFFICE.

KENNETH RUSHTON, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

CAR-TRUCK.

1,198,964.	Specification of Letters Patent.	Patented Sept. 19, 1916.

Application filed June 29, 1916. Serial No. 106,654.

*To all whom it may concern:*

Be it known that I, KENNETH RUSHTON, a citizen of the United States, residing in Philadelphia, Pennsylvania, have invented certain Improvements in Car-Trucks, of which the following is a specification.

My invention relates to certain improvements in that type of truck especially adapted for motor propelled cars in which the bolster is supported from the frame by side springs.

One object of my invention is to improve the connection between the springs and the side frames so that the springs will more readily accommodate themselves to the lateral movement of the bolster.

A further object of the invention is to provide a yielding universal connection between the parts, as will be fully described hereinafter.

In the accompanying drawings: Figure 1 is a side view of a car truck illustrating my invention; Fig. 2 is a sectional view on the line 2—2, Fig. 1; Fig. 3 is a sectional view on the line 3—3, Fig. 1, and Fig. 4 is a detached perspective view illustrating the connection between the spring and the frame.

Referring to the drawings, 1 is the frame of a truck having pedestals 2 in which are mounted the boxes 3 for the axles 4 on which are the wheels 5.

6, 6 are the transoms extending from one side of the frame to the other and adapted to the transoms is the bolster 7 supported by semi-elliptic spring 8, one at each side of the truck. The outer ends of these springs are hung from the frame. This is the ordinary type of side spring truck. Heretofore, there was merely a strap connection between the ends of the spring and the frame and, consequently, the lateral movement of the bolster and its springs was limited, owing to the construction, and unnecessary binding of the parts was the result and, oftentimes, jarring of the car body.

Secured to the upper member of the frame 1 directly above each end of the spring 8 are bearings 9 shaped as clearly shown in Fig. 4, in the present instance, and attached to the frame by through bolts 10. The bearing has a lip 11 which extends over the frame so as to relieve the bolt from strain. 12 is a stirrup having trunnions 13, which are adapted to the bearings 9 and this stirrup supports a coiled spring 14 which, in turn, carries a strap 15 shaped at its lower end to receive the end 8ᵃ of the spring 8.

It will be seen that by mounting the trunnions in the bearings and supporting the springs and the bolster from these trunnions there is a positive suspension from the main frame. There is also a yielding suspension, due to the location of the spring between the stirrup and the strap and by mounting the strap loosely in the stirrup any longitudinal movement of the spring will be accommodated.

Thus, by this construction, I am enabled to make a truck which will ride easier than one in which the ordinary strap is used.

I claim:

1. The combination in a truck, of a side frame; transoms; a bolster between the transoms; a supporting spring of the leaf type secured to the outer ends of the bolster; bearings on the side frame; two stirrups having trunnions mounted in the bearings so that the stirrups can swing laterally; and a strap extending through the stirrups and carrying at its lower end the outer ends of the leaf springs which support the bolster.

2. The combination in a car truck, of a frame having transoms; a bolster located between the transoms; leaf springs of the semi-elliptic type secured to the bolsters at their centers and extending longitudinally of the truck; bearings on the side frame; stirrups having trunnions adapted to the bearings; a coiled spring carried by each stirrup; a strap extending through the stirrups and supported by the said coiled springs and carrying the ends of the semi-elliptic leaf springs.

KENNETH RUSHTON.

Copies of this patent may be obtained for five cents each, by addressing the "Commissioner of Patents, Washington, D. C."